United States Patent
Fork et al.

[11] Patent Number: 6,072,517
[45] Date of Patent: *Jun. 6, 2000

[54] INTEGRATING XEROGRAPHIC LIGHT EMITTER ARRAY WITH GREY SCALE

[75] Inventors: David K. Fork, Palo Alto, Calif.; Zoran D. Popovic, Mississauga, Canada

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/785,233

[22] Filed: Jan. 17, 1997

[51] Int. Cl.[7] .................................................. G01D 15/14
[52] U.S. Cl. ........................... 347/237; 347/130; 347/238
[58] Field of Search ..................... 345/55, 82; 347/237, 347/238, 240, 241, 130, 132; 348/766, 761, 751

[56] References Cited

U.S. PATENT DOCUMENTS

| | | | |
|---|---|---|---|
| 4,535,341 | 8/1985 | Kun et al. | 347/237 |
| 5,043,743 | 8/1991 | Habets et al. | 347/240 |
| 5,198,803 | 3/1993 | Shie et al. | 345/82 |
| 5,337,075 | 8/1994 | Takahashi et al. | 347/241 |
| 5,424,560 | 6/1995 | Norman et al. | 257/40 |
| 5,681,756 | 10/1997 | Norman et al. | 438/35 |
| 5,693,956 | 12/1997 | Shi et al. | 257/40 |
| 5,751,263 | 5/1998 | Huang et al. | 347/238 |

*Primary Examiner*—N. Le
*Assistant Examiner*—Lamson D. Nguyen
*Attorney, Agent, or Firm*—Oliff & Berridge, PLC

[57] ABSTRACT

An integrating xerographic light emitter array includes circuitry for operating an active matrix array of organic light emitting diodes (OLEDs). The light emitter array stages rows of emitters in the slow scan direction and moves the object image and synchronization with the photoreceptor. Grey scale resolution, increased emitter lifetime and the ability to operate at lower light levels are achieved in proportion to the number of stages. The entire printbar can be rewritten during each line time of the photoreceptor, which allows the exposure on any pixel on the photoreceptor to be varied in a number of grey levels from zero to the number of stages. Bringing a grey level signal to the photoreceptor allows improved continuous tone image quality and line placement. Additional grey resolution is obtained by analog driving of individual pixels. This technique is applicable to a variety of emitters or light valves, but is particularly suited to inexpensive OLEDs. Greater exposure uniformity results because each photoreceptor spot receives light from an ensemble of emitters. The integrating xerographic light emitter array can also use static digital memory which is particularly suited to random access display writing.

18 Claims, 9 Drawing Sheets

INTEGRATING XEROGRAPHIC LIGHT EMITTER ARRAY WITH GREY SCALE

BACKGROUND OF THE INVENTION

1. Field of the Invention

This invention relates to xerographic imagers utilizing a light emitter array. In particular, this invention is directed to architectures, characteristics and methods of using a time delay and integration (TDI) technique in organic light emitting diode (OLED) printbars used in such xerographic light emitter arrays.

2. Technical Background

One of the fundamental design challenges for xerographic imaging is getting enough light to the photoreceptor to enable sufficient print speed while providing adequate service lifetime of the printbar. Rapid progress in OLEDs has produced devices which emit light levels greater than computer monitors (300 $cd/m^2$) and fluorescent tubes (3000 $cd/M^2$) in both white and in colors collectively spanning the visible spectrum.

Lifetime studies of OLEDs indicate that diode lifetime is determined to first order by the total charge passed through the OLED. Thus, the OLEDs operate for short times at high brightness or for long times at low brightness. The lower end of the OLED brightness range is most stable, generally sustaining lifetimes of greater than 10,000 hours. The higher end of the OLED brightness range is less stable. For example, OLED devices operating at 1500 $cd/m^2$ currently have sustainable lifetimes of only about 500 hours.

In a one-dimensional page-width array of such currently available OLEDs there is not enough brightness to print documents xerographically at a reasonable speed with reasonable reliability for commercial uses. Table 1 outlines the technical data for a xerographic printer using a single row OLED printbar having OLED emitters operating at 1500 $cd/m^2$. The printbar is illuminating a photoreceptor requiring about 7.5 $ergs/cm^2$. Thus, the print speed of the single row device is about 0.29 pages/min. Moderate print speeds are above five pages/min, and a more desirable print speed is about 30 pages per minute. The brightness deficit determined by this rough calculation is about 100 ×, especially when considering that the brightness and print speed of the single row page-width array of OLEDs leave no room for dead time. Inorganic diode based printbars for example, typically have a duty cycle well under 50% to minimize image blurring on the photoreceptor. Furthermore, the calculated print-speed is the speed before degradation, where the lifetime for the devices is the time to 50% output decay.

TABLE 1

TECHNICAL DATA FOR A CONVENTIONAL SINGLE ROW OLED PRINTBAR

| Light Emitter Inputs | | Outputs | | |
|---|---|---|---|---|
| Average Wavelength | 590 nm | Surface Luminous Flux | 0.4712 | 1 m/cm^2 |
| Avg. Luminous Efficacy | 450 1 m/W | Surface Radiance | 0.0010 | W/cm^2 |
| LED Brightness | 1500 cd/m2 | Surface Radiance | 10472.0 | ergs/sec.cm^2 |
| LED Current Density | 25 mA/cm2 | Photoreceptor Irradiance | 103.778 | ergs/sec.cm^2 |
| Display Voltage | 20 Volts | Pixel Size | 0.0085 | cm |
| Number of Rows | 1 | Pixel Current | 1.79 | uA |
| Array Fill Factor | 88% | Array Emitting Area | 0.26 | cm^2 |
| Optical Inputs | | Array Width | 0.08 | mm |
| Lens Transmittance | 90% | Array Emission | 27.50 | ergs/sec |
| Lens Effective F# | 4.765 | Array Current | 6.623643 | mA |
| Lens Efficiency | 1.0% | Array (Max) Power | 0.13 | Watts |
| Photoreceptor Dose | 7.5 erg/cm^2 | Power Efficiency | 0.2094% | |
| Page Property Inputs | | Page Dose | 5758.05 | ergs |
| Document exc. time | 0 sec | Page Time | 209.42 | sec |
| Fast scan resolution | 300 in-1 | Line Time | 82.12 | msec |
| Slow scan resolution | 300 in-1 | Print Speed | 0.287 | pages/min |
| Fast scan length | 14 in | Data Rate | 0.051 | MHz |
| Slow scan length | 8.5 in | | | |
| Fractional line time | 100% | | | |

The brightness deficit is currently too large to compensate simply by running the diodes harder. For example, operating the OLEDs even briefly at 15000 $cd/M^2$ would require such a high bias that the OLEDs would quickly become inoperative. Furthermore, doing so would only increase the print speed of the single row array to 3 pages/minute. In addition, the total lifetime print volume of the xerographic imager (<9,000 pages) is insufficient.

Commonly assigned U.S. patent application Ser. No. 08/785,232 filed Jan. 17, 1997 to Fork et al., entitled "Active Matrix organic LED Display Device," the disclosure of which is incorporated herein by reference in its entirety, provides circuitry for operating an active matrix array of OLEDs using analog or digital memory. The freedom to place emissive layers on top of existing circuitry allows three-dimensional integration in the design of structures with a nearly 100% fill factor. This is advantageous over inorganic LEDs, which generally require epitaxial growth and therefore prohibit this type of three-dimensional integration. The layout of the pixel circuitry may be optimized depending on various priorities such as maximum fill factor, color processing, ease of manufacture, or ease of operation.

Commonly assigned U.S. patent application Ser. No. 08/785,280 filed Jan. 17, 1997 to Fork, entitled "Integrating Xerographic Light Emitter Array," the disclosure of which is incorporated herein by reference in its entirety, discloses one approach for using OLEDs operated at modest light levels to expose a photoreceptor drum or belt. This is accomplished by staging an array of emitters in the slow scan direction, and clocking the data through pixel driving shift-registers synchronized with the movement of photoreceptor past the array in the slow scan direction. Increased emitter lifetime and the ability to operate at lower light levels are achieved in proportion to the number of stages.

Commonly assigned U.S. patent application Ser. No. 08/785,231 filed Jan. 17, 1997 to Fork, entitled "Self Replacing OLED Printbar," the disclosure of which is incorporated herein by reference in its entirety, proposes another way to extend the lifetime of an OLED-based printbar. This is accomplished by creating a plurality of OLED printbars on a substrate, having all printbars share common optics and selecting a working printbar element in the event of a printbar element failure. Thus, printing is accomplished from a single row of emitters which operate at a high brightness and current. When one row burns out or decays to a level insufficient for printing, that row is deactivated, a new row is activated and printing continues.

SUMMARY OF THE INVENTION

This invention therefore provides an active matrix xerographic light emitter array including pixels arranged in columns and rows and gate drivers that transmit light emission signals to the pixels in every frame. Each gate driver allows the pixels in one row to be programmed by the data lines. All rows are written within one frame cycle by enabling each gate driver successively. The photoreceptor advances one line each frame cycle. A value of any of the light emission signals may be varied between frame periods. Each pixel includes a light emitter, which may be an OLED.

The active matrix xerographic emitter array also includes gate lines, data lines and pixels. Each pixel may include a pass transistor connected to a corresponding gate line to controllably pass a light emission signal from a corresponding data line. The light emission signal activates a continual drive current. A storage device receives the light emission signal from the pass transistor and stores the light emission signal. Upon activation by the light emission signal, a drive transistor passes the continual drive current to an emitter, which may be OLED. The emitter thus emits a light beam.

Each pixel may be individually addressed by one of the gate lines and one of the data lines. Each pass transistor is preferably a pass thin film transistor (TFT), while each drive transistor is preferably a drive TFT.

The light emitters may be stacked on top of the circuitry for each pixel. Thus, this invention provides three-dimensional integration. In a first preferred embodiment, the storage device is a capacitor which stores an analog data signal. In another preferred embodiment, the storage device is a static memory cell which latches a digital data signal for as long as the device receives power.

This invention also provides a method for operating an active matrix xerographic light emitter array, including arranging light emitters into columns and rows, transmitting light emission signals to the light emitters every frame period, and advancing each row of the light emission signals down the columns in synchronization with photoreceptor movement. The light emitter array includes gate lines, data lines and pixels. For each pixel, the method includes activating a pass transistor with a gate line signal, passing a light emission signal from a data line through the pass transistor, storing the light emission signal, using the light emission signal to activate a drive transistor, regulating a continual drive current to the OLED with the light emission signal, and emitting a light beam from the OLED.

A more complete understanding of this invention can be obtained by considering the following detailed description in conjunction with the accompanying drawings.

BRIEF DESCRIPTION OF THE DRAWINGS

The invention is illustrated in the accompanying drawings, wherein like index numerals indicate like parts, in which.

DETAILED DESCRIPTION OF THE PREFERRED EMBODIMENTS

As described in detail below, this invention provides a way to use emitters such as OLEDs operated at modest light levels to expose a photoreceptor drum or belt. This is achieved by staging an array of emitters in the slow scan direction and using active matrix video electronics to activate rows of emitters with data shifting between the rows in synchronization with the photoreceptor movement. The video electronics can terminate the signal anywhere within the column, therefore providing grey scale resolution by integrating the light emission signals over any integer number of the stages. Additional grey resolution is possible by providing different signal levels to the analog drivers of individual pixels. Multilinear color devices for xerocolography or tandem or multipress color architectures are straight-forward extensions of the preferred embodiments of this invention, and thus will not be discussed in detail herein.

Grey scale resolution, increased emitter lifetime and the ability to operate at lower light levels are proportional to the number of stages. This is advantageous over single-row OLED printbars, which do not provide grey scale resolution and which have a short emitter lifetime due to operation at high light levels.

Figure 1:
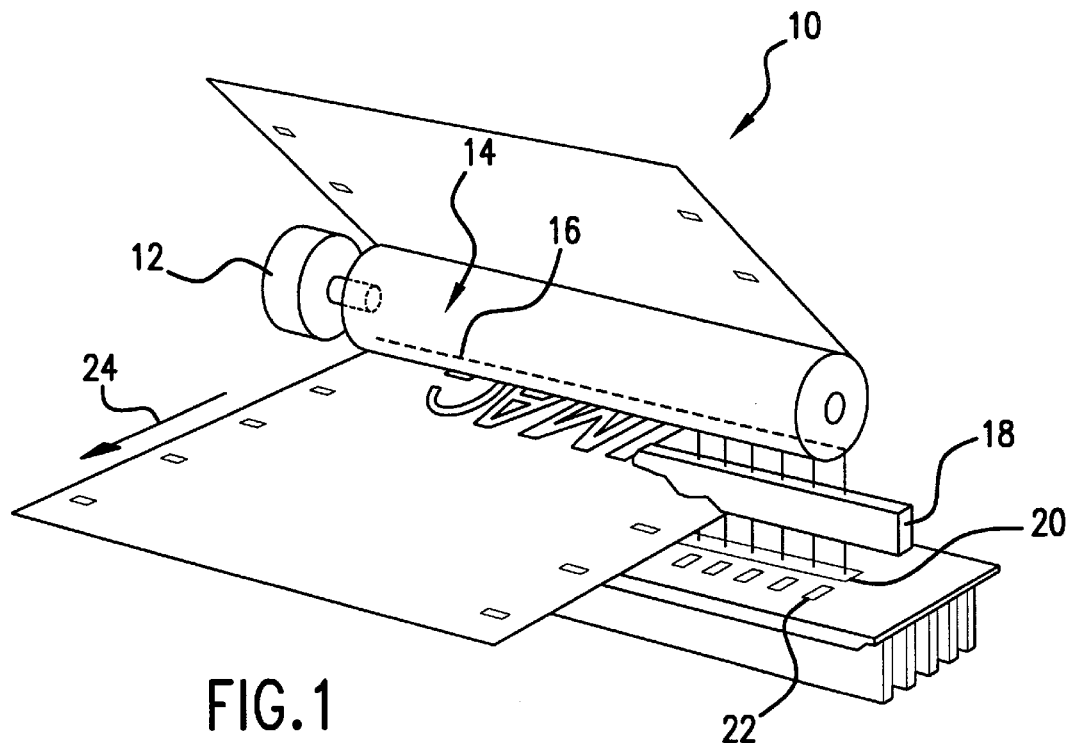
FIG. 1 is a schematic view of an exposure system of an imaging subsystem of a xerographic printer.

FIG. 1 schematically shows an exposure system 10 for a LED array 20 in accordance with the invention. The exposure system 10 includes a position encoder 12, a photoreceptor 14, an imaged line 16, a lens array 18, a LED array 20 and control electronics 22. As the photoreceptor 14 drum rotates, data propagates through the LED array 20 at the same velocity. In other words, the exposure system 10 stages an LED array 20 in the slow scan direction 24 and moves the object image within the LED array 20 synchronously with the rotation of the photoreceptor 14. Because each photoreceptor spot receives light from an ensemble of emitters, the exposure system provides greater uniformity when exposing the photoreceptor 14 because inhomogeneities in the diode brightness are averaged by the ensemble of emitters.

Figure 2:
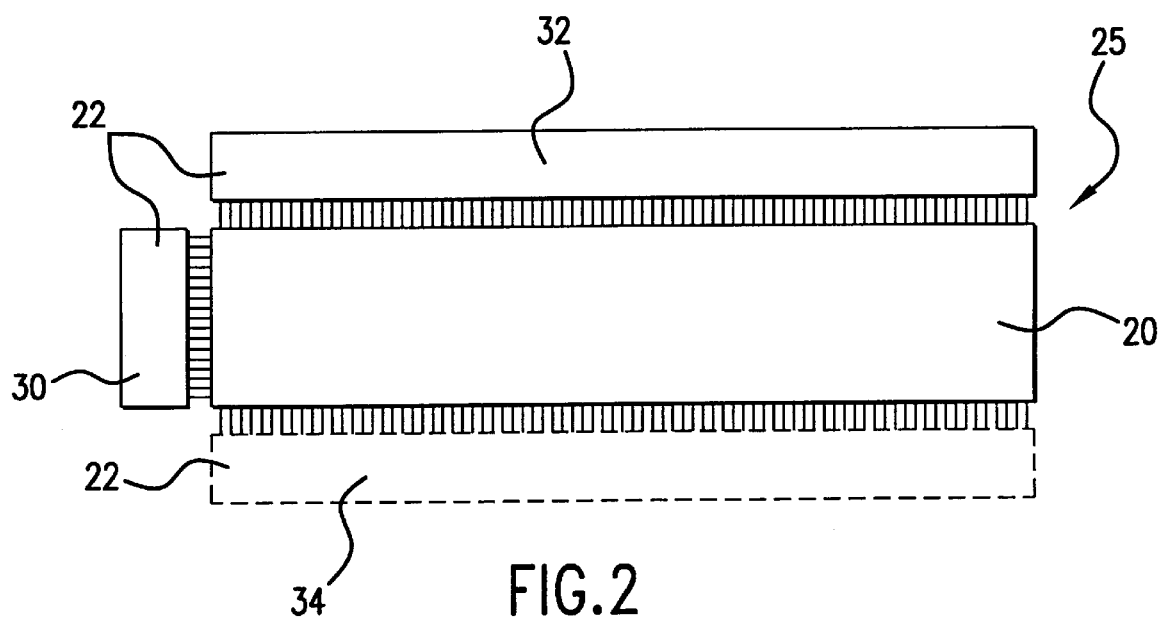
FIG. 2 is a schematic view of a printbar in accordance with a preferred embodiment of the invention.

FIG. 2 illustrates a printbar 25 having data flow similar to an active matrix video display. The printbar 25 includes the LED array 20 and control electronics 22. The control electronics 22 include a plurality of gate drivers 30 and a plurality of data line drivers 32, and may optionally include a plurality of additional data line drivers 34. The LED array 20 has, for example, 64 stages or rows of pixels extending in the direction of the photoreceptor drum rotation and 4200 columns of pixels extending along an axis of rotation of the photoreceptor 14. This forms a 14-inch-wide printbar having 300 spots per inch (SPI). Operating an array having 268,000 pixels (4200 columns×64 rows) requires a high data rate of above about 70 MHz. To compensate for this data rate, the additional data line drivers 34 can be provided.

Figure 3:
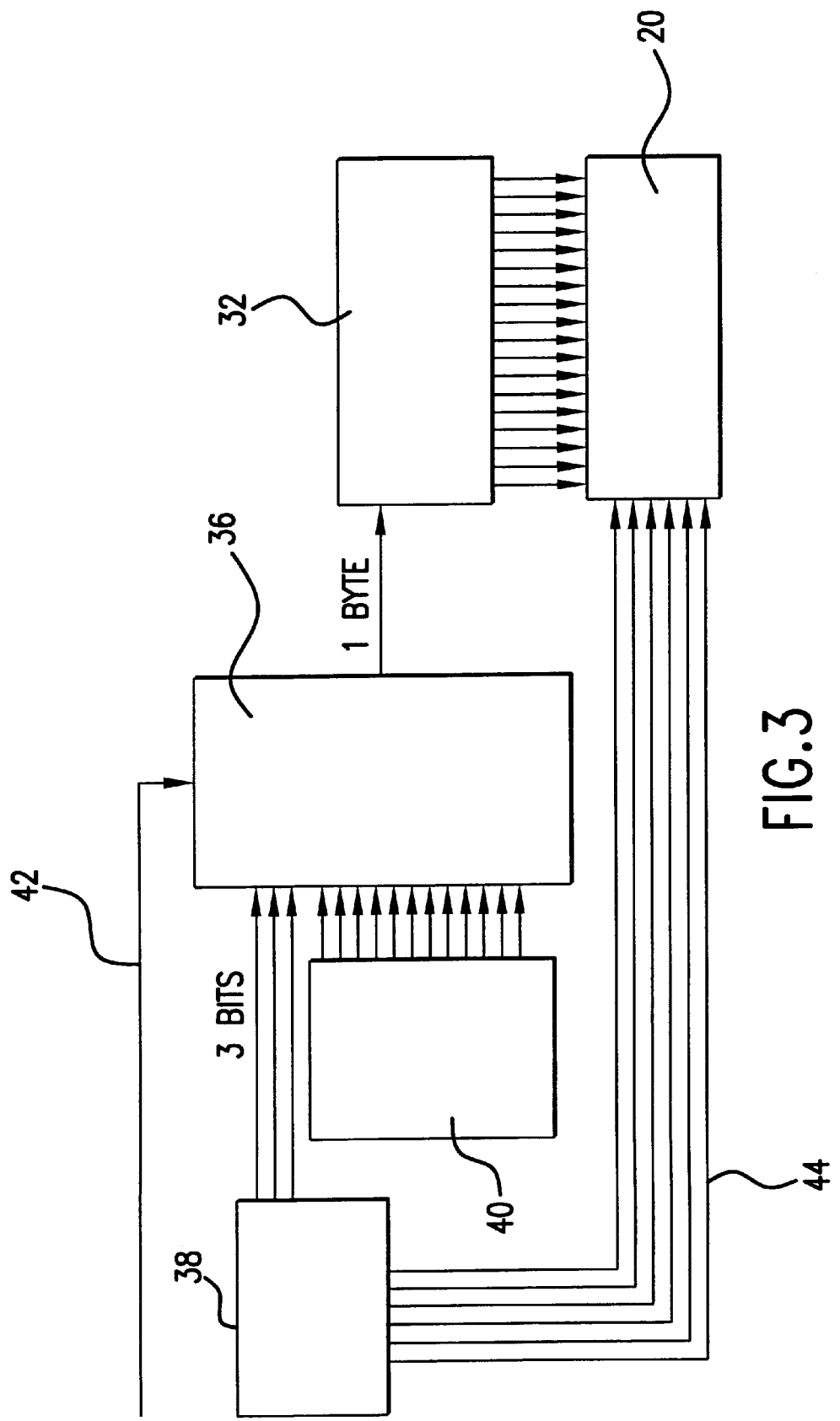
FIG. 3 is a schematic view of the dataflow electronics in accordance with a preferred embodiment of the invention.
Figure 4:
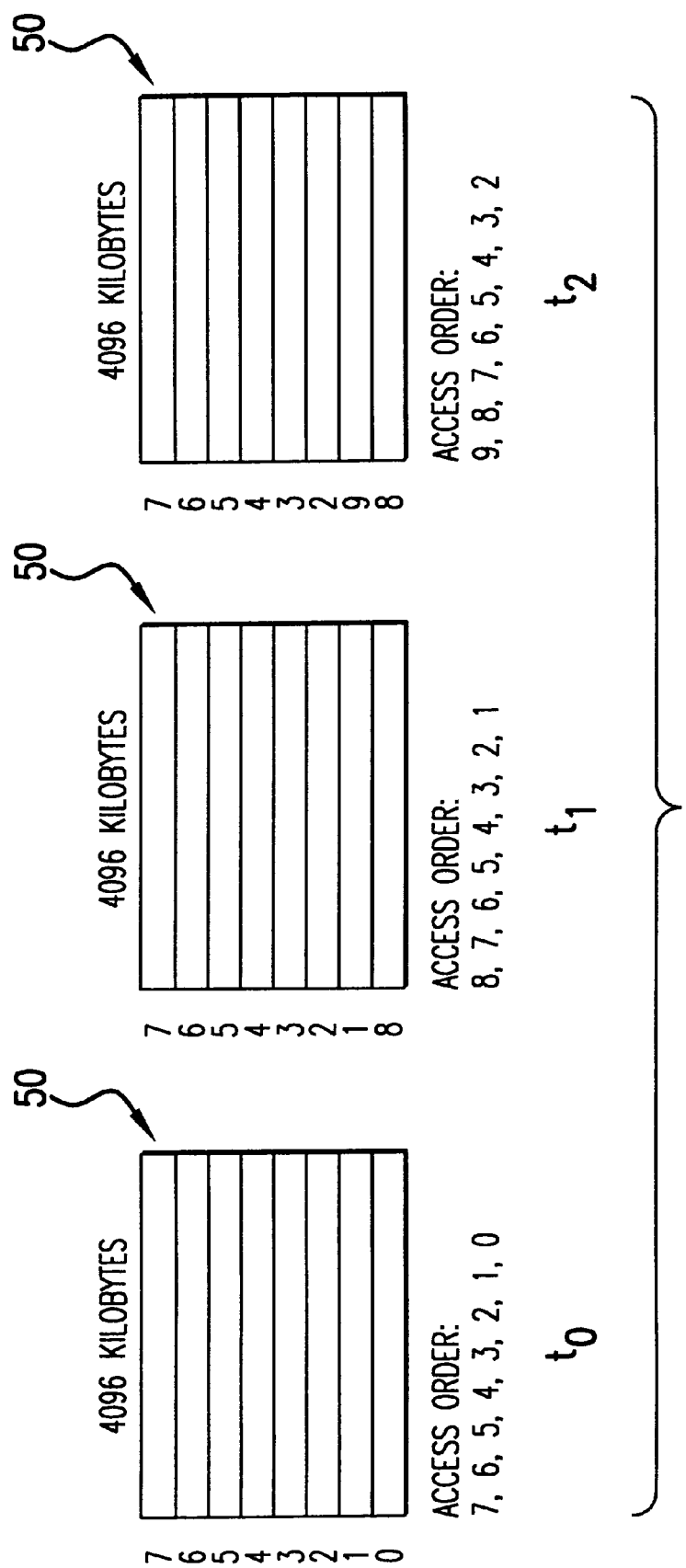
FIG. 4 illustrates three frame cycles of data buffers for buffering a data stream to facilitate driving the printbar array in accordance with a preferred embodiment of the invention.

Data written to the array 20 can be stored in, for example, random access row buffer memory to facilitate data handling. FIG. 3 schematically shows the array 20, the data line driver 32, a memory buffer 36, an address generator 38, a 12 bit counter 40, a data stream input line 42 and 8 row address lines 44. FIG. 4 illustrates one approach for buffering the data stream to facilitate driving the array 20. In FIGS. 3 and 4, there are 8 stages, and 4096 columns, thus eight, 4 kilobyte row buffers 50 may be employed, requiring 32 kilobytes of total memory. In the example, one byte is used for each pixel. A total of 256 levels are available to drive each LED, provided the data driver has 8 bit analog-to-digital converters.

Fifteen address bits are required to address the 32 kilobytes of data. The data will have a fast scan component, corresponding to the 4096 rows, and a slow scan component corresponding to the 8 columns. The lowest order 12 bits address the fast scan component, accordingly the address pattern of the first 12 bits is the same for each row, and can be supplied by a 12-bit counter. The 3 highest order bits specify the slow scan component.

Before each framing cycle, a new 4096 byte block of data is written to the memory buffer 36 from the input data stream, overwriting the row data which has resided longest in memory, and which has already been used for 8 previous framing cycles. During each framing cycle, the appropriate data is sent to the data line drivers 32, by using a simple logic device which generates waveforms for the appropriate 3 highest-order bits required to access the memory buffer 36, and which also drives the correct gate line row addresses on the printbar array 20. Three such framing cycles are illustrated in FIG. 4. The appropriate data is therefore addressed and passed into the data line drivers 32.

Figure 5:
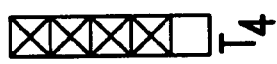
FIG. 5 is a schematic view of one column of LEDs in a 5 stage device at five successive time intervals.
Figure 5:
Figure 5:
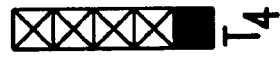
Figure 5:
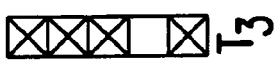
Figure 5:
Figure 5:
Figure 5:
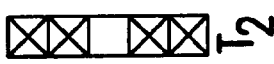
Figure 5:
Figure 5:
Figure 5:
Figure 5:
Figure 5:
Figure 5:
Figure 5:
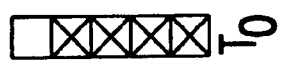
Figure 5:
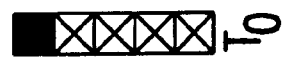

If required, a bit mask (not shown) may be employed to interrupt the exposure of a single point of the photoreceptor to generate additional grey levels as illustrated in the level 3 writing in FIG. 5. The image data is shifted down the columns of the array 20 by rewriting the entire array 20 each time the photoreceptor 14 advances by one pixel width in the process direction. Therefore, one framing cycle of the display is equal to one line time for the photoreceptor 14. For example FIG. 5 shows one column of LEDs in a 5-stage device at successive intervals $t_0$ through $t_4$. Each interval corresponds to one framing cycle. Three time series are considered. In each case, only the LEDs used to write the data in one line on the photoreceptor 14 are considered. The other LEDs apply to different lines on the photoreceptor 14 at each respective time, and are indicated as "don't care".

To write the highest level exposure to the photoreceptor 14, a level 5 in this case, each of the 5 LEDs are turned on in sequence. To write the lowest level, each of the 5 LEDs is in the off state at the appropriate times. To write an intermediate level, such as a level 3 in the illustration, 3 of the five emitters are turned on at the appropriate times. Thus, there are in fact 5!/(3!2!)=10 different ways to write a level 3 exposure to the photoreceptor 14, by selecting 3 out of the 5 pixels to use for the exposure, whereas there is only one way to write either a level 0 or a level 5. In the example above, pixels are driven either on or off. In some embodiments, each pixel may be driven with more than one bit of resolution, thereby multiplying the grey scale resolution by $2^n$ where n is the number of bits of data resolution.

Figure 6:
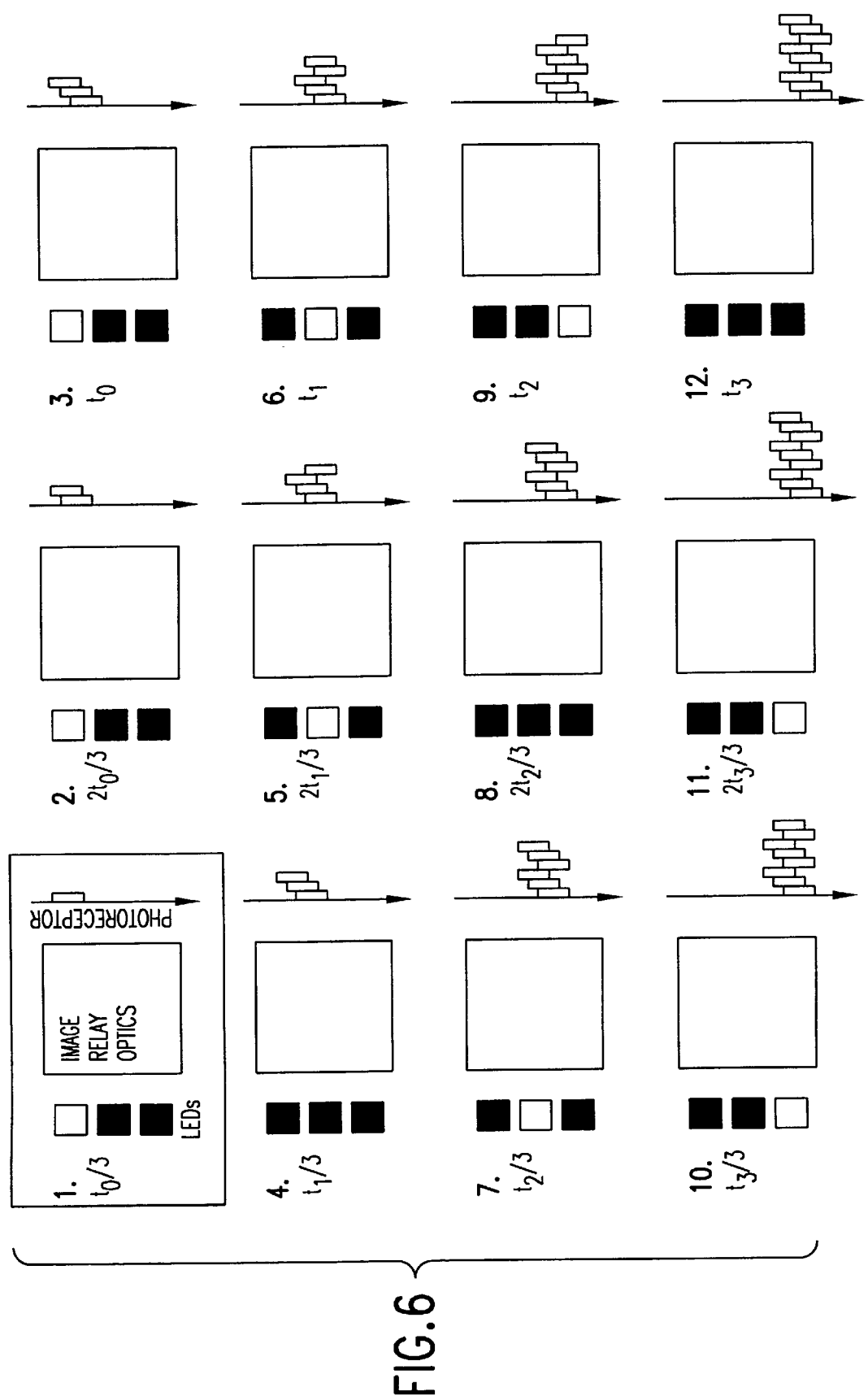
FIG. 6 is a schematic view of the timing and exposure for a three stage printbar device in which each row of LEDs is written during one-third of a frame cycle.

Because the rows of the printbar array 20 are written successively, in the active matrix addressing scheme, one has at most $1/n^{th}$ of a frame cycle to write each row of the array 20 with n rows. FIG. 6 shows a schematic for the detailed timing and exposure which results for a three-stage-printbar device in which each row of LEDs is written during exactly one-third of a frame cycle. Each time step of the series illustrates the three LEDs in a single column of the array 20, and the photoreceptor 14 as it moves relative to the imager. When an exposure occurs it is represented schematically as a thin box on the photoreceptor 14 where the exposure occurs. Each panel in FIG. 6 is one third of a framing cycle apart in time. FIG. 6 illustrates a single light spot being written to the photoreceptor. The panels in FIG. 6 illustrate the following actions taking place on the array 20:

1. set LED in first row on
2. set LED in second row off
3. set LED in third row off
4. set LED in first row off
5. set LED in second row on
6. set LED in third row off
7. set LED in first row off
8. set LED in second row off
9. set LED in third row on
10. set LED in first row off
11. set LED in second row off
12. set LED in third row off Notice that there is a blurring of the edges of the exposure due to the finite size of the LED and the finite exposure time. LEDs of smaller dimensions in the process direction may be used to mitigate this blur effect. Notice that the LEDs in FIG. 6 are spaced one-third of a line-height apart. This is done to assure that the exposure from successive rows of LEDs overlap correctly in the process direction, because the time interval between the start of exposure from a given row, and the subsequent start of exposure from the row below it is $(1+1/n)t_f$. This spacing requirement actually provides additional space for non-emissive parts of the array by improving the overall aperture ratio. Note also that, because of this timing effect, the spacing and timing requirements are not the same as conventional time-delay and integration devices such as TDI charged coupled devices where the dataflow is based on shift registers and occurs in unison for all rows. This approach is actually a modified form of TDI.

Unlike active matrix LCD displays, in which a stored charge sets a state of a light valve, an OLED emits light in response to a continual drive current. Driving a high resolution OLED display requires that each pixel emitter receive a programmable forward bias current throughout the framing period of the display. For a 60 Hz display, the framing period is about 16 milliseconds. Either analog or digital memory is used to store the pixel state during the framing period.

Due to the density of connections required to address the at least 300-SPI-resolution printbar, multiplexers of some type may be desired as the preferred embodiments approach the wire bonding density limit. The same process steps disclosed below to fabricate the pixel circuitry could be applied to create the peripheral data multiplexer circuitry.

The drive electronics of an analog memory pixel require a memory cell and a current source placed at each pixel. Higher resolution printing is possible with this first preferred embodiment of the drive circuits of this invention than with, for example, the shift register based Integrating Xerographic Light Emitter Array discussed above, because only two transistors per pixel are required. Since the memory cell of the first preferred embodiment of the drive circuit stores an analog signal, the number of grey levels can potentially be extended beyond simply the number of printbar stages.

Figure 7:
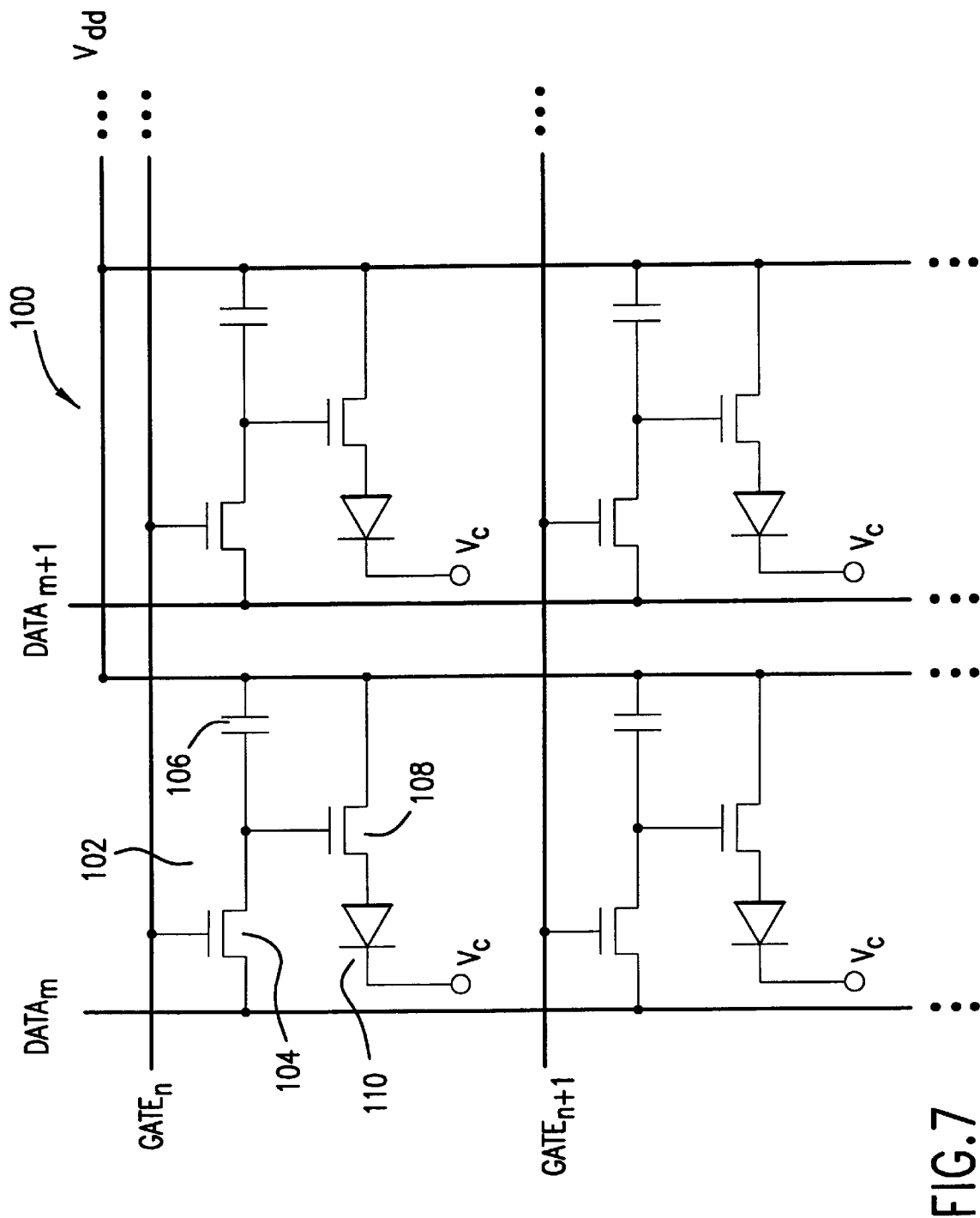
FIG. 7 is a circuit diagram of a portion of an analog active matrix OLED array in accordance with a first preferred embodiment of the invention.

FIG. 7 shows the first preferred embodiment of the analog drive circuit 100 storing the pixel state. Each pixel 102 of the analog drive circuit 100 contains a pass transistor 104, a capacitor 106, a drive transistor 108 and an OLED 110. The pass transistors 104 in a row n are turned on by a gate line n. When turned on, the pass transistor 104 for a row n of the column m allows a light emission signal from the data line m to be stored on the capacitor 106 of the pixel 102. After the pass transistor 104 for the column m is turned off by the gate line n, the light emission signal input over the data line m and held on the capacitor 106 programs the channel conductance of the drive transistor 108.

The drive transistor 108 regulates the current flow to the OLED 110 throughout the current framing period. Within a single framing period, each gate line n is turned on for no more than 1/n of the framing period, where n is the number of rows. The capacitor 106 of each column of the turned-on row is written simultaneously with data on the corresponding data line while the gate line is turned on.

The capacitor 106 is only needed if the gate capacitance of the drive transistor 108 is not sufficient to hold the light emission signal for the full framing period. Thus, if the gate capacitance of the drive transistor 108 is sufficient to hold the light emission signal, the capacitor 106 is preferably omitted. In this case, the light emission signal is held on and simultaneously turns on the drive transistor 108. In this first preferred embodiment of the analog drive circuit 100, the current flows through the drive transistor 108, into the anode of the OLED 110 and then into a common cathode layer connected to all of the OLEDs 110 of the analog drive circuit 100.

Figure 8:
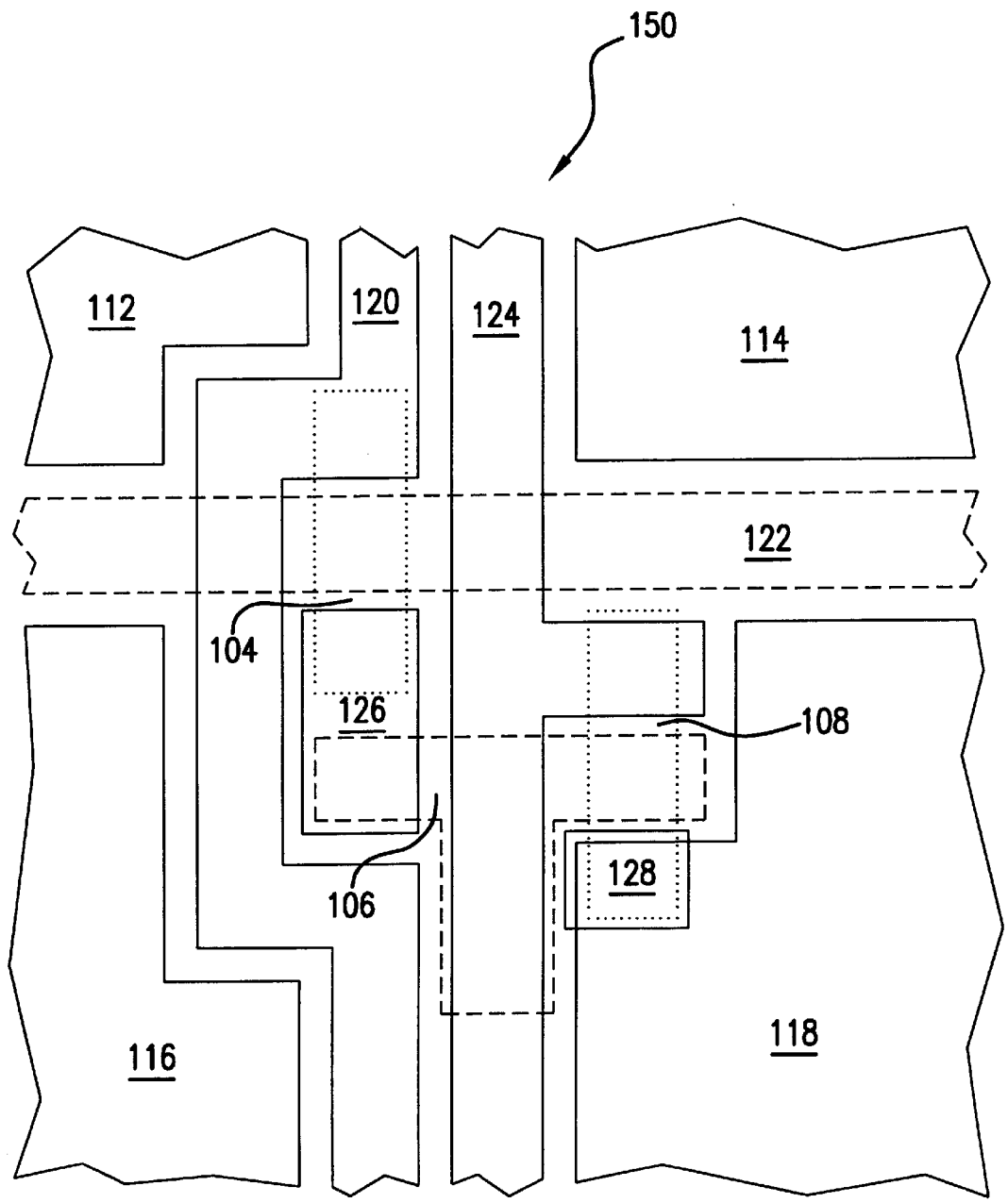
FIG. 8 is a preferred schematic layout of a four-pixel intersection for implementing the circuit diagram of FIG. 7.

A preferred example of a 4-pixel intersection used in implementing the first preferred embodiment of the analog drive circuit 100 of FIG. 7 is shown schematically in FIG. 8. FIG. 8 shows two metal layers, a polysilicon layer and circuit contacts. The first metal layer includes the anodes 112, 114, 116 and 118 for four separate pixels 102, a data line 120, a $V_{DD}$ line 124, and the circuit contacts 126 and 128. The second metal layer includes a gate line 122 and one plate of the capacitor 106. The other plate of the capacitor 106 is formed by the $V_{DD}$ line 124. The polysilicon layer includes the pass transistor 104 and the drive transistor 108. The contact 126 connects the pass transistor 104 to the capacitor 106. The contact 128 connects the drive transistor 108 to the anode 118 of the OLED 110.

This topology supports using either top or bottom gate transistors as the pass transistors 104 and the drive transistors 108. If necessary, the capacitor 106 need not require substantial additional area because it can be fabricated directly over the $V_{DD}$ line 124. This highlights one of the advantages of OLEDs over inorganic LEDs, which generally require epitaxial growth and therefore prohibit this type of three-dimensional integration. There are many layout variations possible for implementing the circuits described herein with respect to the topology of the devices, the layers used for their fabrication, and the methods of processing. The description set forth in FIG. 8 is not intended to be limiting.

The $V_{DD}$ line 124 can be located parallel to the gate line 122 or to the data line 120. In this first preferred embodiment, the $V_{DD}$ line 124 is parallel to the data line 120 in order to minimize the inherent capacitance of the data line 120.

Figures 9, 10, 11:
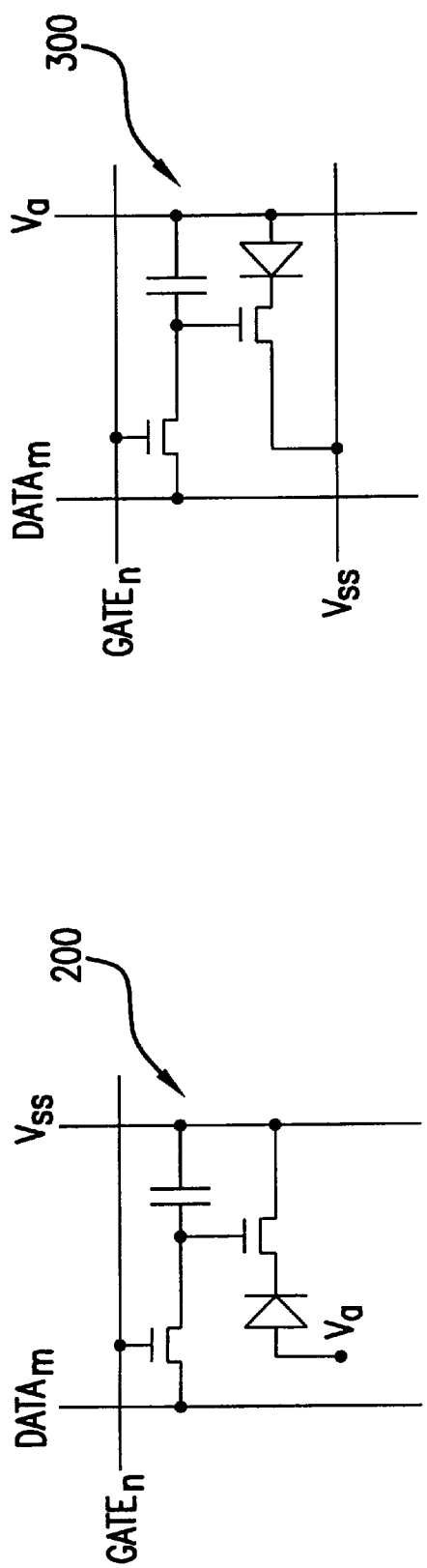
FIG. 9 illustrates a second preferred embodiment of the pixel electronics of the printbar device of FIG. 2.
FIG. 10 illustrates a third preferred embodiment of the pixel electronics of the printbar device of FIG. 2.
FIG. 11 illustrates a fourth preferred embodiment of the pixel electronics of the printbar device of FIG. 2.

FIGS. 9–11 illustrate second-fourth preferred embodiments of the analog drive circuitry. The drive circuits 100 and 200 of FIGS. 7 and 9 have the advantage that, at the pixel level, one of the diode contacts is separate from the remainder of the circuit and is common to all of the diodes. Thus, a design which does not require interrupting the deposition of the organic layers, and either the cathode layer of FIG. 7 or the anode layer of FIG. 9, is possible. Alternatively, this avoids running additional lines to the pixels 102. The analog drive circuits 300 and 400 of FIGS. 10 and 11 are less desirable in this respect, since, at the pixel level, both sides of the diode electrically contact the circuit.

There are hundreds of known organic compounds, both polymeric and molecular, which are currently applicable to OLEDs. Since all devices based on these compounds have electrical characteristics suitable for excitation with TFTs, this invention applies to all such compounds, including compounds not yet investigated. The OLEDs of this invention may use emitter materials such as poly[2-methoxy-5-(2'-ethyl-hexyloxy)-1,4-phenylene vinylene] (MEH-PPV), or tris(8-hydroxy) quinoline aluminum (AlQ) for example. Hole injection materials such as N,N'-diphenyl-N,N'-bis(3-methylphenyl)1-1'biphenyl-4,4'diamine (TPD) are also applicable, as are additional electron transport layers, dopants, electrolytes, buffer layers etc. Materials such as PPV and TPD have an electron affinity well matched to the work function of an anode layer formed by indium tin oxide (ITO). Since ITO can be fabricated to be transparent, the anode side of the OLEDs 110 is typically the emissive side. The cathode contact is, for example, an opaque metallic conductor such as aluminum, calcium or magnesium silver alloy. Since, when constructing an OLED display device, the OLEDs 110 will probably be fabricated last, the analog drive circuits 100 and 400 would most likely be used in a backside emitting display. The potentially fragile and sensitive cathode contact of the analog drive circuits 100 and 400 is advantageously deposited in a continuous layer and does not require patterning at the pixel layer. The analog drive circuit 200 of FIG. 9 advantageously can have a continuous ITO layer with close to a 100% fill factor.

Figure 12:
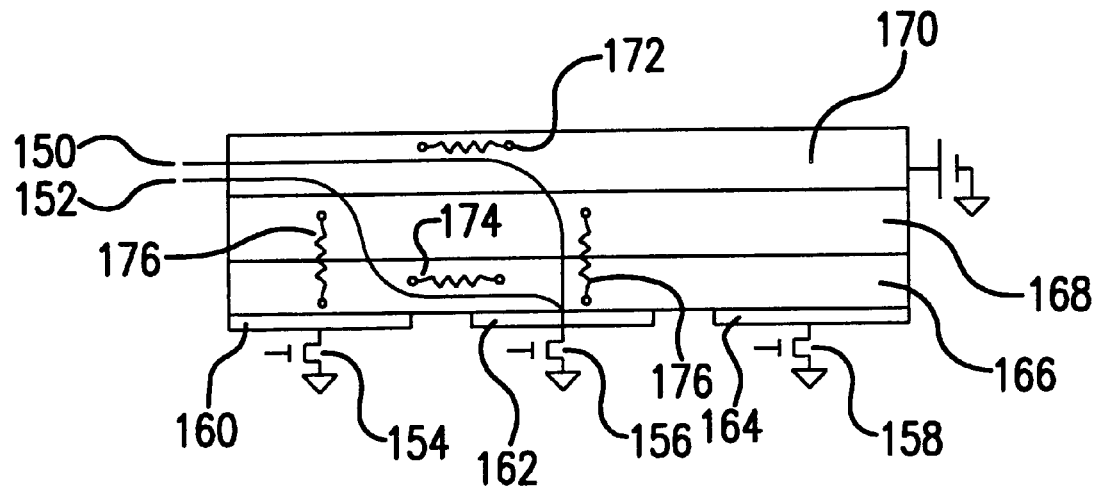
FIG. 12 illustrates several possible current paths for a continuous anode layer for a front emitting display.

FIG. 12 shows possible current paths 150 and 152 for a continuous anode layer 170 of a front emitting display using, for example, the analog drive circuit 200 of FIG. 9. Current flows from the anode, through the organic layers to a pixelated cathode and finally to an "on" drive TFT 156. The analog drive circuit 200 is fabricated with the display area having isolated islands of exposed cathode contact regions 160, 162 and 164. The analog drive circuit 200 is then coated with a continuous electron conducting layer 166. Additional layers (not shown), if necessary, can be formed over the continuous electron conducting layer 160. A continuous hole conducting layer 168, such as PPV or TPD, is then formed. A continuous anode contact layer 170, such as ITO, is formed over the continuous hole conducting layer 168. The current path 152 produces cross-talk emission from adjacent pixel if the spreading resistance of the continuous electron conducting layer 166 is too low. To avoid near neighbor pixel interactions, one requirement is $$R_{172} \ll R_{174},$$

where:

$R_{172}$ is the sheet resistance of the anode contact 170, and $R_{174}$ is the pixel-to-pixel resistance of the electron conducting layer 166.

The lateral resistance $R_{174}$ is very high for two reasons. First, the organic materials are poor conductors with low mobility. Second, the continuous electron conducting layer 166 and any additional necessary electron conducting layers are required by the operating principle to be very thin (i.e., <100 nm). Spreading resistance therefore assures that the continuous contact anode layer 170 can be left unpatterned. Thus, this layout naturally lends itself to a front-side emitting display. With sufficient process control and a proper mask set, the front side emitting design can have the OLEDs 110 overlaid on the pixel circuit shown in FIG. 8 to obtain a device with a nearly 100% fill factor. Replacing the continuous contact anode layer 170 with cathodic material and using a sufficient mask set results in a process suited to a backside emitting design, with a reflecting continuous top electrode.

Figure 13:
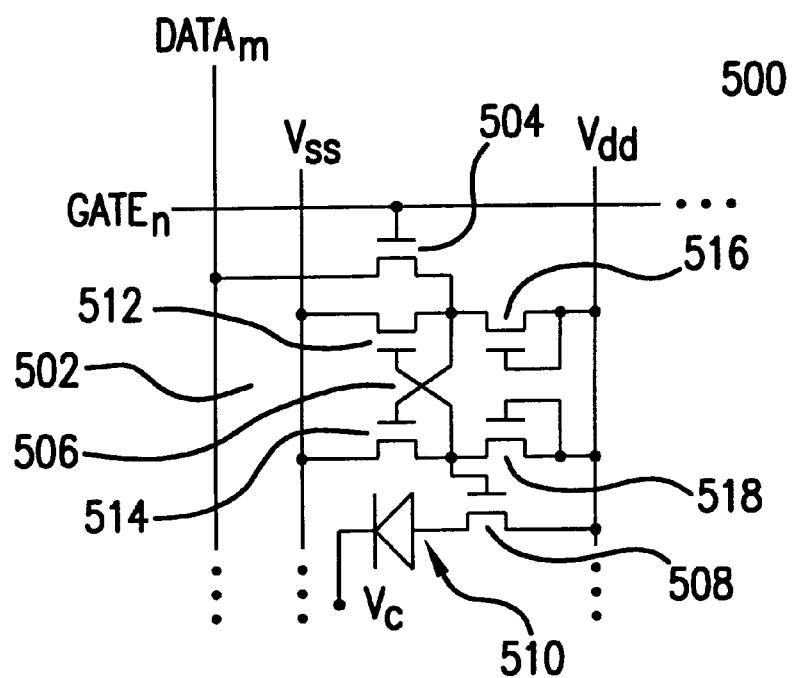
FIG. 13 is a circuit diagram of a digital state drive circuit for an OLED pixel in accordance with a fifth preferred embodiment of the invention.

FIG. 13 illustrates a fifth preferred embodiment of this current invention using a digital drive circuit 500 for the OLED pixel 502. The pixel 502 includes a gate line n, a data line m, connections to $V_{DD}$ and $V_{SS}$, a pass TFT 504, single bit static random access memory (SRAM) cell 506, a drive TFT 508, pull-down transistors 512 and 514, load transistors 516 and 518 and an OLED 510. A binary value, either a "1" or a "0", is stored by the single bit SRAM cell 506 provided in each pixel 502. The single bit SRAM cell 506 is, for example, a polysilicon NMOS static memory cell.

The charge lost in the single-bit SRAM cell 506 is restored by the charge flow through the load transistors 516 and 518. The gate line turns on the pass TFT 504, allowing the bit value ("0" or "1") on the data line m to be written to the SRAM cell 506. The stored bit controls the gate of the drive TFT 508. Turning on the drive TFT 508 allows current to flow through one OLED 510, or to turn "off" the drive TFT 508 of the OLED 510.

This digital drive circuit 500 requires six transistors per pixel 502 and is insensitive to leakage currents. Therefore, this digital drive circuit 500 will hold the state of the pixel 502 indefinitely. Accordingly, an advantage of the digital drive circuit 500 of this second preferred embodiment is that the display may be written by random access methods, making a framing cycle unnecessary. Additional grey scale may be achieved by modulation of the duty cycle. The layout is more area intensive due to the larger number and connectivity of the transistors. The fifth embodiment described above and illustrated in FIG. 13 uses NMOS TFTs and a common cathode. There are numerous variations of this description using PMOS or CMOS TFTs, and common anode connectivity which are implicitly described.

The technical data for an integrating xerographic light emitter array is illustrated in Table 2. In Table 2, a refresh rate for each pixel is 3.5 milliseconds. This is much longer than the approximately 1 microsecond required for an OLED pixel circuit to charge its capacitor and turn on.

For lifetime and stability considerations, a brightness of 300 cd/m$^2$ was chosen in the red visible frequency. A BZP photoreceptor requiring 7.5 ergs/cm$^2$ dose was chosen. Sixty-four stages of OLED elements were used in each column. The emitter width in the slow scan direction is thus approximately 5 millimeters at 300 dpi, which is within the field width range of available selfoc relay lenses. The assumed effective F# of the selfoc relay lens is 4.77, which results in a lens efficiency of 1%. In other words, 1% of the emitted light is relayed to the photoreceptor. The lens efficiency for a relay lens was assumed, and is about 1%. A 14 inch wide print drum or belt, an industry standard, was also assumed.

As specified, the emitter array 20 consumes less than 1 watt and prints at about 6.75 pages per minute. Depending on the type of photoreceptor used, up to about a four fold increase in photosensitivity and print speeds can be achieved. The emitters can emit into less solid angles with dielectric microcavity mirrors, or with surface microlens arrays, which would considerably enhance the 1% throughput efficiency used in this example.

TABLE 2

TECHNICAL DATA FOR A 300 dpi OLED EMITTER ARRAY OPERATED IN
ACCORDANCE WITH THE FIRST PREFERRED EMBODIMENT OF THE INVENTION

| Light Emitter Inputs | | | Outputs | | |
|---|---|---|---|---|---|
| Wavelength | 633 | nm | Surface Luminous Flux | 0.0942 | 1 m/cm$^2$ |
| Luminous Efficacy | 250 | 1 m/W | Surface Radiance | 0.0004 | W/cm$^2$ |
| LED Brightness | 300 | cd/m2 | Surface Radiance | 3769.9 | ergs/sec.cm$^2$ |
| LED Current Density | 3 | mA/cm2 | Photoreceptor Irradiance | 37.360 | ergs/sec.cm$^2$ |
| Display Voltage | 15 | Volts | Array Width | 4200 | pixels |
| Number of Rows | 64 | | Pixel Size | 0.0085 | cm |
| Array Fill Factor | 90% | | Pixel Current | 0.22 | uA |
| Optical Inputs | | | Array Emitting Area | 17.34 | cm$^2$ |
| Lens Transmittance | 90% | | Array Height | 5.42 | mm |
| Lens Effective F# | 4.765 | | Array Emission | 647.89 | ergs/sec |
| Lens Efficiency | 1.0% | | Array Current | 52.0 | mA |
| Photoreceptor Dose | 7.5 | erg/cm$^2$ | Array (Max) Power | 0.78 | Watts |
| Page Property Inputs | | | Quantum Efficiency | 0.8378% | |
| Document exc. time | 0 | sec | Page Dose | 5758.05 | ergs |
| Fast scan resolution | 300 | in-1 | Page Time | 8.89 | sac |
| Slow scan resolution | 300 | in-1 | Frame Time | 3.49 | msec |
| Fast scan length | 14 | in | Print Speed | 6.75 | pages/min |
| Slow scan length | 8.5 | in | Data Rate | 77.13 | MHz |
| Fractional line time | 100% | | Data Line Rate | 18.36 | KHz |

This example differs from that outlined in Table 1 chiefly in the data rate, print speed and the emitter brightness. Because data in the printbar must be recreated every line time, the data rate increases to, for example, over 70 MHz. The print speed of the printbar of Table 2, 6.75 pages/min., is about 24 times faster than the print speed of the printbar of Table 1, which is 0.287 pages/min. If constructed with OLEDs lasting 10,000 hours, the printbar of Table 2 would have an expected lifetime of about 1,000,000 pages, which is over 50 times more print volume than the printbar of Table 1. The printbar of Table 2 outputs significantly larger amounts of light to the photoreceptor than the printbar of Table 1, thus allowing it to print pages faster and to last longer than the single row printbar of Table 1.

While this invention is described in detail herein with specific reference to certain illustrative embodiments, it is to be understood that there is no intent to be limited to these embodiments. For example, commonly assigned U.S. patent appliation Ser. No. 08/785,232 filed Jan. 17, 1997 to Fork et al. entitled "Active Matrix Organic LED Display Device" the disclosure of which is incorporated herein by reference in its entirety, proposes pixel circuitry that one of ordinary skill in the art at the time the invention was made would understand as additional embodiments of the pixel circuitry described herein. The aim is to cover all modifications, alternatives and equivalents falling within the spirit and scope of the invention as defined by the claims. The invention is applicable to all types of printing devices that use light beams to form images. Such printing devices include facsimile machines, copiers, printers, etc.

What is claimed is:

1. An active matrix xerographic light emitter array for exposing an image onto a photoreceptor, the photoreceptor moving past the array, the array comprising:

a plurality of pixels arranged in a plurality of columns and a plurality of rows, the plurality of rows being arranged in a process direction of the photoreceptor, the photoreceptor advancing one pixel width in the process direction for one frame period, each of the pixels having an organic light emitting diode; and a plurality of data drivers transmitting a plurality of analog light emission signals to the plurality of pixels every successive frame period; and a plurality of gate drivers connected to both the plurality of pixels and the plurality of data drivers, the plurality of gate drivers advancing, between successive frame periods, each of the analog light emission signals down the columns synchronously with movement of the photoreceptor, such that all of the plurality of rows are successively rewritten with the analog light emission signals between successive frame periods and a light spot on the photoreceptor is successively exposed during each frame period in accordance with a value of the light emission signal transmitted during the frame period.

2. The active matrix xerographic light emitter array of claim 1, wherein the value of any of the plurality of light emission signals is varied between successive frame periods to expose a grey scale image onto the photoreceptor.

3. The active matrix xerographic light emitter array of claim 1, further comprising:
- a plurality of gate lines, each of the gate lines extending from one of the gate drivers and oriented with one of the rows; and
- a plurality of data lines, each of the data lines oriented with one of the columns;
- wherein each of the plurality of pixels comprises:
  - a pass transistor connected to a corresponding one of the plurality of gate lines and a corresponding one of the plurality of data lines, the pass transistor controllably passing one of the light emission signals from the corresponding one of the plurality of data lines, the passed light emission signals controlling an activation of a continual drive current; and
  - a drive transistor passing the continual drive current to one of the light emitters through each of the framing periods upon activation by the one of the light emission signals.

4. The active matrix xerographic light emitter array of claim 3, wherein each of the plurality of pixels is individually addressed by the corresponding one of the gate lines and the corresponding one of the data lines.

5. The active matrix xerographic light emitter array of claim 3, wherein the pass transistor is a pass thin film transistor and the drive transistor is a drive thin film transistor.

6. The active matrix xerographic light emitter array of claim 3, wherein each organic light emitting diode corresponds to one of the plurality of pixels and is positioned opposite at least one of the corresponding gate line, the corresponding data line, the pass transistor and the drive transistor.

7. The active matrix xerographic light emitter array of claim 1, wherein each of the plurality of pixels further comprises a storage device receiving the one of the light emission signals from the pass transistor and storing the received light emission signal.

8. The active matrix xerographic light emitter array of claim 7, wherein the storage device is a capacitor.

9. The active matrix xerographic light emitter array of claim 7, wherein the storage device is a static random access memory cell.

10. A method for operating an active matrix xerographic light emitter array to expose an image on a photoreceptor, comprising:
- arranging a plurality of pixels into a plurality of columns and a plurality of rows, the plurality of rows being arranged in a process direction of the photoreceptor, the photoreceptor advancing one pixel width in the process direction for one frame period, each of the pixels having a an organic light emitting diode;
- transmitting a plurality of analog light emission signals to the plurality of pixels every successive frame period with a plurality of gate drivers;
- advancing each of the rows of the analog light emission signals down the columns between successive frame periods synchronously with movement of the photoreceptor; and
- successively rewriting all the plurality of rows with the light emission signals between successive frame periods; and
- successively exposing a light spot on the photoreceptor during each frame period in accordance with the value of the light emission signal transmitted during that frame period.

11. The method of claim 10, further comprising the step of modifying the value of any of the plurality of light emission signals between successive frame periods to expose a grey scale image on the photoreceptor.

12. The method of claim 10, further comprising the step:
- activating, for each pixel, a pass transistor with a corresponding gate line;
- passing, for each pixel, a light emission signal from a corresponding data line through the pass transistor;
- sending, for each pixel, the light emission signal to a drive transistor;
- regulating, in each pixel, a continual drive current to the organic light emitting diode based on the light emission signal; and
- emitting, in each pixel, a light beam from the organic light emitting device based on the continual drive current.

13. The method of claim 12, further comprising the step individually addressing each of the plurality of pixels by the corresponding gate line and the corresponding data line.

14. The method of claim 12, wherein the pass transistor is a pass thin film transistor and the drive transistor is a drive thin film transistor.

15. The method of claim 12, wherein each organic light emitting diode corresponds to one of the plurality of pixels and is positioned opposite at least one of the corresponding gate line, the corresponding data line, the pass transistor and the drive transistor.

16. The method of claim 10, further comprising the step storing, in each pixel, the data signal in a storage device.

17. The method of claim 16, wherein the storage device is a capacitor.

18. The method of claim 16, wherein the storage device is a static random access memory cell.

* * * * *